April 26, 1960   P. ROSENTHAL   2,933,978
ELECTRICAL CONTROL FOR MICRO-FILM PROJECTOR
Filed Sept. 14, 1955   4 Sheets-Sheet 1
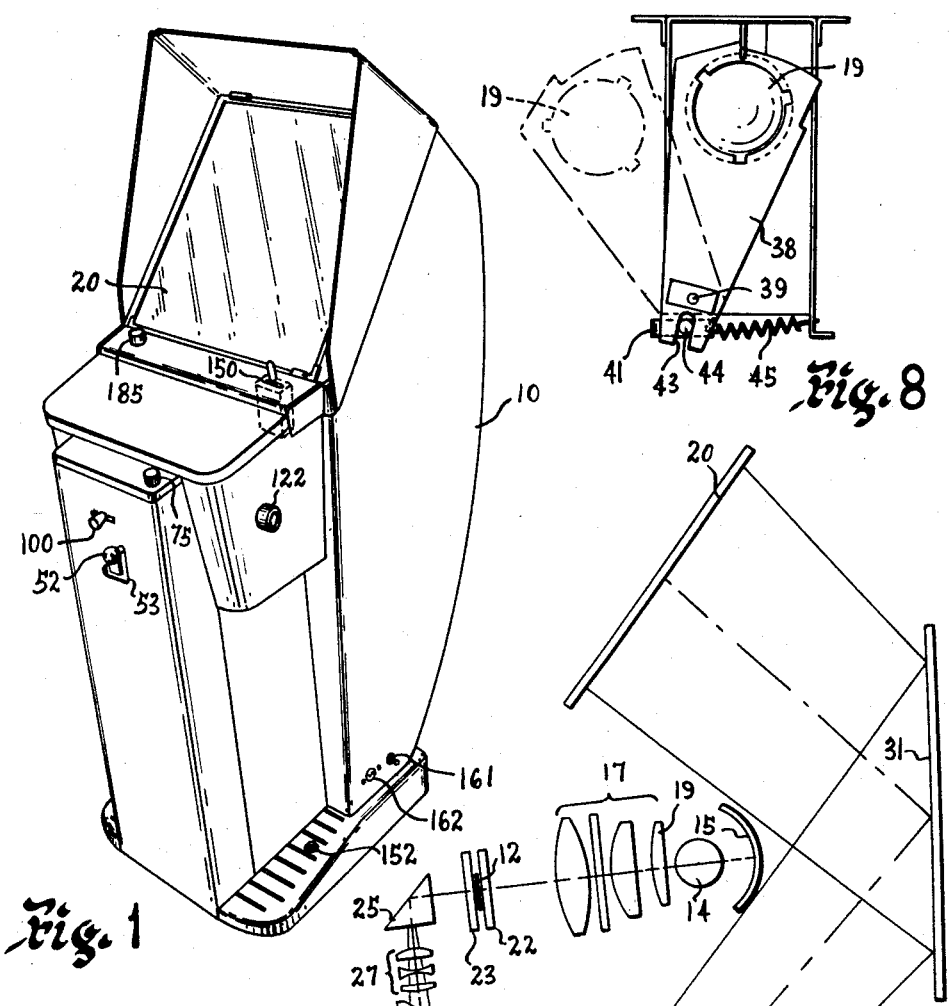
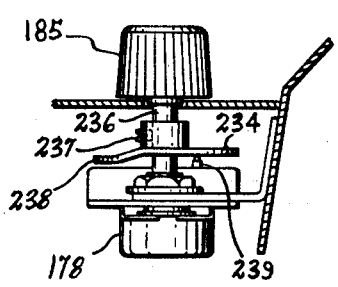
INVENTOR
PAUL ROSENTHAL
BY Herbert C. Kimball
ATTORNEY INVENTOR
PAUL ROSENTHAL
BY Herbert C. Kimball
ATTORNEY

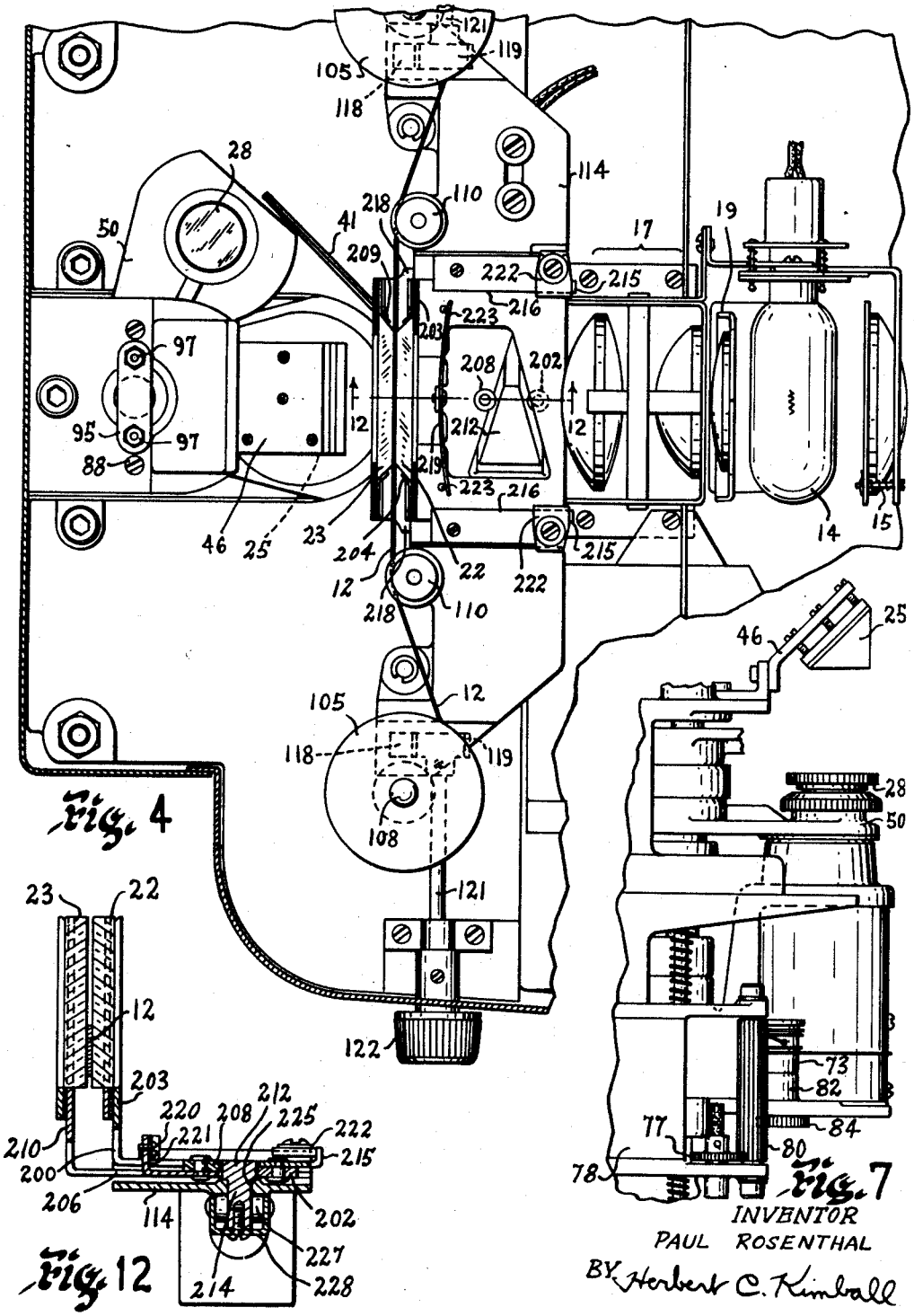

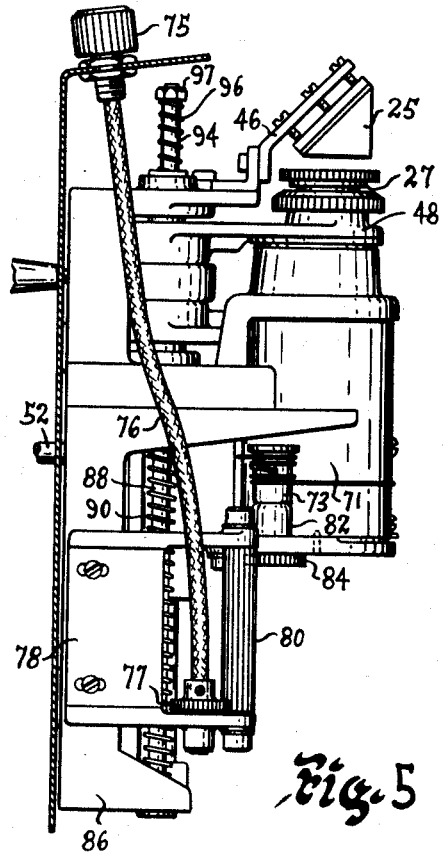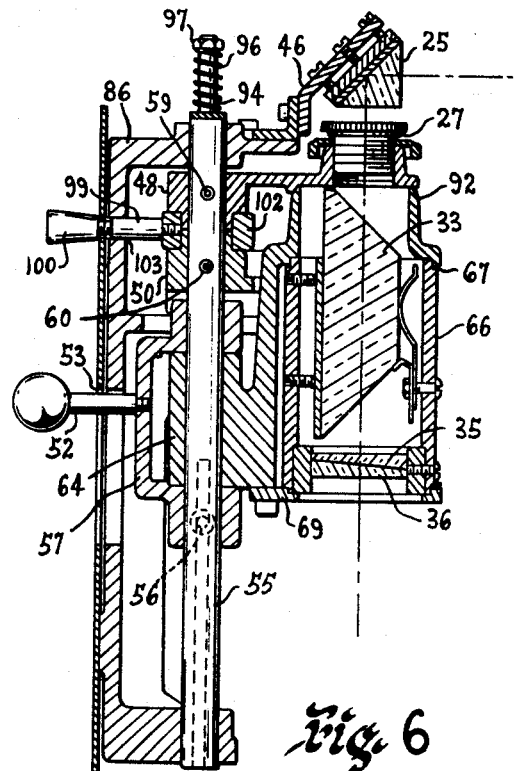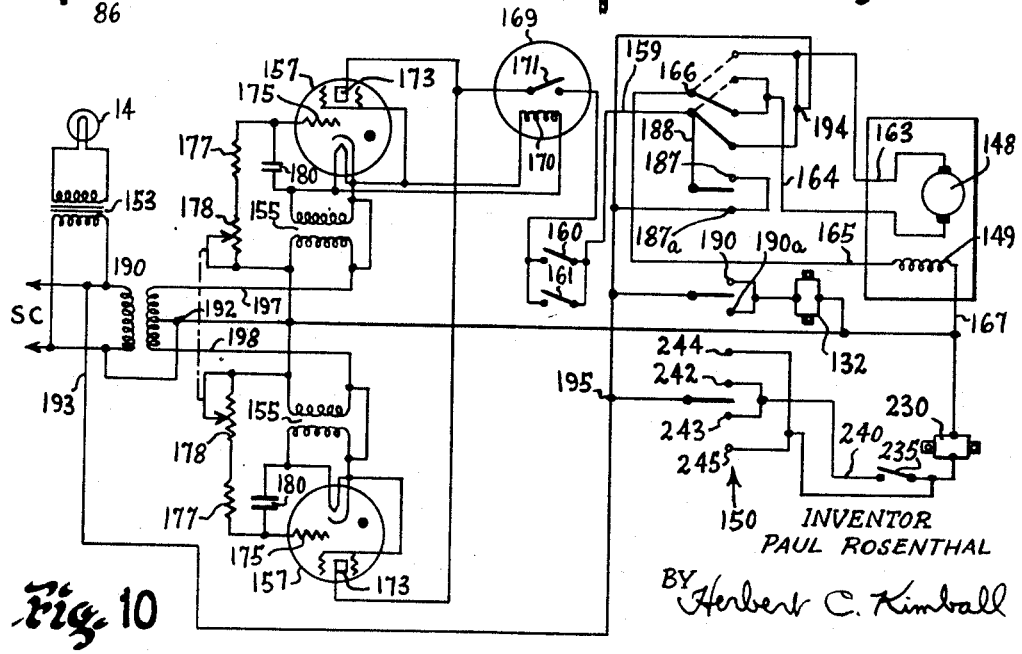

United States Patent Office 2,933,978
Patented Apr. 26, 1960

2,933,978

ELECTRICAL CONTROL FOR MICRO-FILM PROJECTOR

Paul Rosenthal, Buffalo, N.Y., assignor to American Optical Company, Southbridge, Mass., a voluntary association of Massachusetts Application September 14, 1955, Serial No. 534,260

2 Claims. (Cl. 88—24)

This invention relates to micro-film readers and similar devices for projecting strip film which is moved across a film gate located in the optical path of a projector.

An object of the present invention is to improve the accuracy of the positioning of the portion of the film in the film gate and accordingly under observation. The use of pressure plates for this purpose is a well-known expedient. There is but little likelihood that pressure plates properly spaced will cause scratching of the film when the film in passing between the pressure plates (for scanning) travels at low speeds. The proper spacing for scanning speeds gives so little clearance for the film that the film plane cannot deviate appreciably from the object plane of the optical system and a sharp screen image results, yet is sufficient so that there is not that pressure on the surfaces of the film which leads to rubbing and scratching. At medium and high speeds the spacing must be considerably increased or considerable damage may occur.

In accordance with the present invention, a common control determines the speed of the film and the separation of the pressure plates. Because of variations in the abrasion resistance of the film or a change in the size and number of characters per screen image, and always because of the human factor, an adjustment in the exact point in the speed range at which the separation of the pressure plates changes may be desirable. Accordingly I provide an adjustment of the common control means to take care of this. The present invention avoids important mechanical difficulties by applying such a common control to electrically actuated means for changing the separation of the pressure plates and to electrical speed control of an electric motor which drives the winding means for moving strip film across the film gate. Such a common control of the film speed and of the separation of the pressure plates is of particular advantage with an electric motor in which the supply of actuating current during slow speed driving of the film winding mechanism is controlled by a thermionic tube. An example of such an electric motor control is to be found in the U.S. patent to Beitz 2,610,540, granted September 16, 1952, and a modified form of the same in the U.S. patent to Critoph 2,615,148, granted October 21, 1952.

In the drawings which illustrate my invention:

Fig. 1 is a perspective view of a projection device embodying my invention;

Fig. 2 is a schematic view of the optical system of the projection device;

Fig. 4 is a plan view of the mechanism shown in Fig. 3 together with part of the optical system;

Fig. 5 is a view in elevation of the portion of the optical system (including the objective) at the front of the cabinet;

Fig. 6 is a view of this portion of the optical system in section on the optical axis;

Fig. 7 is a view similar to Fig. 5 showing the optical system arranged for lower magnification;

Fig. 8 is a detail view in rear elevation showing an insertable element of the condenser system in both inserted and retracted positions;

Fig. 10 is a similar wiring diagram in which the common control means comprises two thermionic tubes to provide full wave rectification;

Fig. 11 is a detail view of the common control means;

Fig. 12 is a sectional view through the pressure plates on the line 12—12 in Fig. 4.

Figure 3:
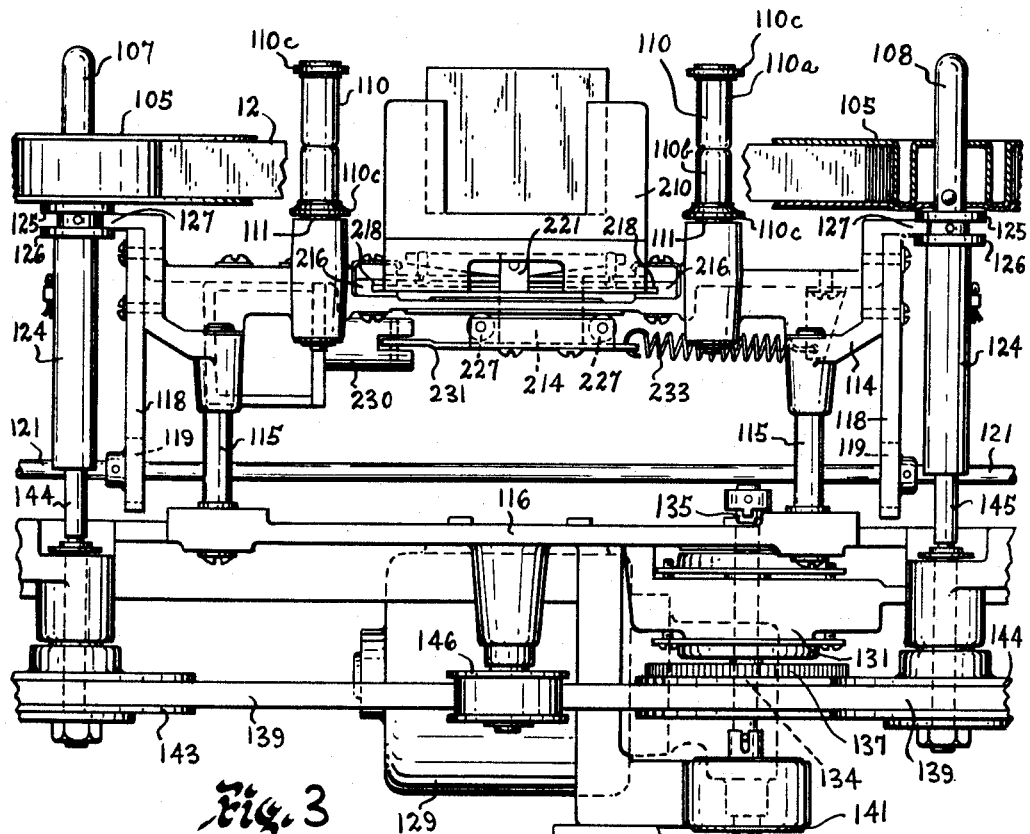
Fig. 3 is a front elevational view of the film winding mechanism, and showing the pressure plates in the film gate.

Referring to the drawings which illustrate a preferred embodiment of my invention, the projection device is housed within a cabinet generally indicated by the numeral 10, with various control knobs and switch levers conveniently arranged for the operation of the projection device. These knobs and levers will be later described in greater detail. Assuming that the strip film 12 may be moved across a film gate located in the optical path of the projection device by film winding mechanism to be later described in connection with Figs. 3 and 4, the optical principles of the projection system will now be described in connection with Fig. 2.

For the sake of compactness, I prefer to use a folded system. As arranged in one such system illustrated in Fig. 2, the light source is a lamp 14 backed by a reflector 15 for emitting a beam of light focused on the strip film 12 by the condenser system generally indicated by the number 17. It is desirable to use different objectives to impart different magnifications to the material on the film being projected onto the screen 20. It would also be desirable to use a different condenser system for each objective so that the brightness of the image thrown on the screen does not decrease with higher magnification. For reasons of convenience and expense, the elements of condenser system 17 used in association by the lower power objective are made usable with a higher power objective by inserting an element 19. Element 19 is shown in inserted position in full lines in Fig. 4, and in retracted position in broken lines. Mechanism will be described for thus altering the condenser system 17 so as to cooperate with either a lower power objective or a higher power objective.

The portion of the strip film 12 in the film gate is, for purposes of accurate observation, maintained in focus by opposed pressure plates 22 and 23. At above mentioned the separation of these plates is controlled by the same control which determines the speed of the film winding mechanism. The beam of light, after passing through the strip film, is directed by the prism 25 down through the objective 27 or 28 as the case may be, to a lower mirror 30, thence to a back mirror 31 and so onto the viewing screen 20.

The lamp 14 is centrally located, and the emitted beam is directed toward the front of the cabinet 10 with the result that the objective is located at the very front of the cabinet where it may be conveniently shifted by the operator for different magnifications. For high power magnification, a group of lenses 27 forms the objective and this group is located fairly close to the prism 25 as shown in Fig. 6. For lower magnification, a different group of lenses 28 (not seen in Fig. 2) is swung into the optical path at a position more remote from prism 25 as shown in Fig. 7.

The optical path also passes through a so-called Dove prism or roof prism 33 mounted for rotation about the optical path as an axis. This has the well known effect of rotating the image projected on the screen 20. If desired a color corrector wedge consisting of prisms 35 and 36 may be mounted in the optical path adjacent the roof prism 33 to compensate the axial dispersion of the latter.

During scanning, the strip film is moved across the film gate located in the optical path at relatively low speed. If the operator knows that a fairly remote section of the film is wanted, the winding mechanism is driven at high speed until such section is approached, when scanning is resumed. When the desired information or view is located, the winding mechanism is halted, and if desired the orientation of the figure, view or printed material is changed by rotating the prism 33.

As above mentioned, there is a need for modification of the condenser system each time the objectives are interchanged, and for convenience in operation the insertion or retraction of element 19 accompanies automatically the interchange of objectives. As shown in Fig. 8 the insertable element 19 is carried by a mount 38 pivoted at 39 to swing from the inserted position shown in full lines to the retracted position shown in broken lines. A dog-leg shaped lever 41 (see Fig. 4) is actuated by the swinging into operative position of the objective 28 (later described in more detail) to impart oscillation to the mount 38 through the notch 43 in the lower end of the mount which is engaged by the pin 44 on the lever 41. A spring 45 biases the mount 38 toward retracted position. The lever 41 swings on a pivot (not shown) adjacent the bend in the lever, so that when the objective 28 is swung into the optical path, the lever 41 (see Fig. 4) moves in a counter clockwise direction to move the pin 44 to the right as viewed in Fig. 8.

The prism 25 is fixed in position by its carrier 46. Below the prism 25, the objectives 27 and 28 are carried by oscillatable mountings 48 and 50 for alternate use in the optical system. A lever 52 projecting through a J-shaped slot 53 in the front of the cabinet 10 controls the magnifying power of the optical system. When the lever 52 is in the position shown in Fig. 1 the objective 27 is in the operative position shown in Figs. 5 and 6 for imparting higher magnification. The lever 52 is not fixed to vertical rock shaft 55, but is splined thereto at 56. Accordingly the movement of the lever 52 in the vertical portion of the J slot 53 raises or lowers the yoke 57 to which the lever 52 is fixed, but does not rotate the rock shaft 55. The movement of the lever 52 in the horizontal portion of the J slot rocks the shaft 55. At the end of such a movement to the left as viewed in Fig. 1 there is a slight rise in the slot 53 which permits a corresponding rise in yoke 57.

Mountings 48 and 50 are fixed by pins at 59 and 60 respectively to the rock shaft 55, and objective 27 is oscillated out of the optical path and objective 28 into the optical path when the lever 52 is moved from right to left in the horizontal portion of the slot 53 (see Fig. 1). A movement of the lever 52 in the opposite direction in the horizontal portion of slot 53 returns objective 27 to operative position. The edge of mounting 50 rides against the adjacent end of lever 41 to cam the insertable element 19 (Fig. 8) to operative position.

The mounting 64 for the Dove prism 33 is not fixed to the rock shaft 55 and prism 33 is retained permanently in the optical path. The mounting 64 is, however, raised and lowered on shaft 55 as yoke 57, which embraces it, is raised and lowered during movement of lever 52 in the vertical portion of slot 53.

Prism 33 is adjustably positioned in a rotatable cylindrical housing 66. This housing rotates relative to a bearing 67 in the mounting 64, and is retained against this bearing by a ring 69. The wedges 35 and 36 are likewise retained in position on the housing 66 by the ring 69.

A belt or cord 71 passed about the cylindrical housing 66 and also about a hub 73 brings about rotation of the prism 33 when the hub 73 is driven. The drive for the hub 73 originates with a knob 75 (see Figs. 1 and 5) at the front of the cabinet 10. Through a flexible drive shaft 76 the knob 75 rotates a spur gear 77 which is carried by a stationary bracket 78. The spur gear 77 meshes with an elongated vertically arranged spline gear 80 which is carried by the same bracket 78. The hub 73 is rotatably mounted in a bearing 82 in the mounting 64 for the prism 33. Beneath the bearing 82, an extension of the hub 73 carries a spur gear 84 which meshes with spline gear 80 to complete the drive from knob 75 to housing 66, no matter what the position of mounting 64 may be on shaft 55. Accordingly the orientation of prism 33 is under the control of knob 75 at all times.

The rock shaft 55 is vertically slidable (and also rotatable) in a portion 86 of the frame of the projection device, the bracket 78 being supported on this same portion. Two vertical rods of which only one, 88, is shown in Fig. 5 are supported by the portion 86. As indicated in Fig. 4, there is one of these vertical rods to either side of rock shaft 55. A perforated ear (not shown) on the side of the mounting 64 rides up and down on each of these vertical rods so as to maintain the mounting 64 against swinging movement about shaft 55. At the same time a spring 90 on each rod 88 urges the ears and with them the mounting 64 upwardly. When the lever 52 is pushed downwardly in slot 53 the springs 90 are compressed. When the lever 52 is released at either end of the slot 53, the springs 90 raise the mounting 64 so that its upper rim 92 is pushed up into snug inter-engagement with the mounting 48 or 50 as the case may be.

A pair of studs 94 fixed in the frame portion 86 mount springs 96 so as to bear at one end on nuts 97 and at the other end on a strap 95 (see Figs. 4 and 5). The upper end of shaft 55 is pushed upwardly against the strap 95 by the action of the pair of springs 90. A stud 99 with operating handle 100 extends from a ring 102 through a cam slot 103 in frame portion 86. The ring 102, which surrounds shaft 55 is assembled as a rotatable sleeve confined between mountings 48 and 50 when the mountings are pinned to the shaft 55. When the stud 99 is moved by handle 100 (see Fig. 1), the shaft 55 is moved slightly up or down as the case may be to bring the material projected onto screen 20 into better focus. The objectives 27 and 28 when originally inserted in their mountings are par-focalized, but differences in film may introduce slight differences in the object plane.

The film winding mechanism shown more particularly in Figs. 3 and 4 accommodates more than one width of strip film. The particular reels 105 shown in Fig. 3 on the spindles 107 and 108 carry film 12 which in width is one-half the capacity of the guide rollers 110. Wider film up to the capacity of guide rollers 110 can be accommodated. The latter are of improved design to permit projection of different widths of film, in that the rollers are each divided into two sections 110a and 110b carried by a spindle 111. The upper section 110a may be removed from the spindle 111 and turned upside down so that its flange 110c is adjacent the section 110b and in guiding relation to the narrower width of film.

The spindles 107, 108 and 111 are rotatably carried by an elevator frame 114 which slides vertically on posts 115 fixed in the main frame 116 of the projection device. The elevator frame 114 carries a rack 118 at each end, meshing with a pinion 119. Each pinion 119 is fixed to a shaft 121 which carries an operating knob 122 on the end thereof which projects outside the cabinet 10. As the elevator frame is thus raised or lowered, the film winding mechanism but not its drive is raised or lowered relative to the optical path with the result that the operator may seek out a particular portion of the film 12 and center it with respect to the optical path (see Fig. 2) and accordingly the screen 20.

The lower end of each reel spindle 107 or 108 is fixed in a cylindrical sleeve 124 having parallel flanges 125 and 126 at its upper end portion. As each sleeve 124 rotates during driving of film winding mechanism, it is prevented from raising or falling relative to the elevator frame 114 by a rider 127 fixed to the frame 114 which engages in the groove between flanges 125 and 126.

The driving mechanism is carried by the main frame 116, and includes a universal (A.C.-D.C.) type electric motor 129 and gear transmission 131 together with solenoid 132 controlled clutches 134 and 135 for connecting the motor 129 alternatively in driving relation either directly (clutch 134) for high speed or through clutch 135 and the gear transmission 131 for lower speeds. The final gear 137 of the gear transmission has secured to it a drive pulley (not shown) through which the V belt 139 is driven. When clutch 134 is engaged, shaft 141 which is a motor driven shaft is directly connected to gear 137 and drives belt 139 through the drive pulley secured to it. When clutch 134 is disengaged (by relaxation of solenoid 132), clutch 135 is engaged, and drive shaft 141 transmits power through the gear transmission 131 ending in gear 137.

Pulley 143 is on the lower end of a shaft 144 journaled in the main frame 116 and splined within sleeve 124 of spindle 107. Pulley 144 similarly is on the lower end of a shaft 145 splined within the sleeve secured to spindle 108. A third pulley 146 is an adjustable idler for wrapping the V belt about as much of the circumference of pulleys 143 and 144 as possible and for taking up slack in the belt. Due to the spline connection, drive of either sleeve 124 as the case may be continues no matter where pinions 119 engage racks 118. Pulleys 143 and 144 are not fixed on their shafts but each is connected to its shaft by a pawl and ratchet connection (not shown), so that when pulley 143 is driven to wind film on the reel on spindle 107, pulley 144 is free to rotate relative to shaft 145, and vice versa.

The motor 129 has its armature 148 (see Fig. 9) and field 149 windings connected in series. A five position switch 150 determines whether the motor shall run (a) at high speed in one direction—switch at extreme left; (b) at low speed in that same direction—switch in intermediate left position; (c) stop—switch in middle or neutral position; (d) at low speed in opposite direction—switch in intermediate right position; or (e) at high speed in opposite direction—switch in extreme right position. Starting with the switch in neutral or middle position, and the main switch 152 closed, the light source 14 is energized through transformer 153. A transformer 155 for heating the filament 156 of a gas filled thermionic power transmitting tube 157 is also energized. This tube has the same function as the thermionic tube in the Beitz Patent 2,610,540, patented September 16, 1952, where this function is described more in detail. No current flows through the armature 148, however, unless the low speed power circuit 159 is closed and connected to the armature by switch 150.

It is often convenient to use the hands for writing or other purposes, and so a foot switch 160 (which may be plugged in at 162 in Fig. 1) is provided for stopping the motor (at low speed only) to permit reading a selected portion of the projected material. A toggle switch 161 may be closed if the foot switch is not to be used.

The armature leads 163 and 164 are connected in opposed relation to the five position switch 150, so that when the switch is moved to one intermediate position the current controlled by thermionic tube 157 passes through the armature in one direction, and when the switch is moved to the other intermediate position the current supplied through low speed circuit 159 passes through the armature in the opposite direction. One lead 165 of the field coil is connected at 166 in series with the armature and the other lead 167 is connected to the source of A.C. current supply marked SC.

Assuming that switch 150 is moved to the intermediate position which connects circuit 159 to armature lead 163, and that lead 164 is connected to lead 165 at 166, the supply of current to the series motor is under control of tube 157. This tube is prevented from supplying current before its cathode is properly heated by a conventional thermal type time-delay relay 169. The heating coil 170 of the time-delay relay is connected in parallel with the filament 156 of the power tube 157 so that the bimetal snap-switch 171 of the relay will not close before the cathode of tube 157 is heated, thereafter remaining closed so long as filament 156 is energized. The switch 171 is located in series in the power circuit between the anode 173 of tube 157 and circuit 159.

During one half of each A.C. cycle the anode is positive with respect to the cathode of power tube 157; and provided the grid 175 thereof is not negative with respect to the cathode, direct current will be transmitted by tube 157. (Once the gas in tube 157 starts the flow of current, such flow continues for the remainder of the half cycle regardless of how negative grid 175 may become.) To determine the point in the half cycle at which the grid 175 becomes positive with respect to the cathode, in other words to shift the phase of current supply, the grid 175 is connected in a phase-shifting control circuit comprising a fixed resistor 177 in series with variable resistor 178 which is in turn connected to an end terminal of the transformer 155 and thus to one side of the A.C. power supply. Capacitor 180 is connected between the grid 175 and the terminal 182 which is the least positive terminal of the transformer 155, and is part of the control circuit.

Thus fixed resistance 177 and resistance 178 under the control of knob 185 (see Fig. 11), together with capacitor 180, when of proper ratings, are used as phase-shifting means to control the time during each positive half cycle when the grid 175 will become positive with respective to the cathode of power tube 157. Thus knob 185 controls the portion of each positive half cycle during which current is supplied by power tube 157 to motor 129. If current is supplied during a larger portion of each positive half cycle the speed of the film winding mechanism is increased, and vice versa.

Thus far the slow speed drive of the film winding mechanism, either to the right or to the left, has been described. The switch 150 passes through the "stop" position before the direction of drive is reversed. When the switch 150 is moved past intermediate position in either direction, high speed drive of the motor by alternating current is obtained. The blades or contacts of switch 150 are so arranged that alternating current from SC is directly supplied to motor 129 through contact 187 (or 187a as the case may be) and circuit 188 before power from SC is supplied through contact 190 or 190a to solenoid 132 to directly clutch the drive shaft 141 to gear 137 for high speed transmission.

In Fig. 10 is shown a wiring diagram of a modified form of control for motor 129. This modified form has certain advantages in that by using two power tubes twice as many current pulses are supplied. This almost doubles the upper speed to which the motor 129 may be carried while operating by power supplied through a thermionic tube. The lower speed limit remains practically unchanged because due to variation in thermionic tubes, resistors and capacitors, one thermionic tube will always drop out of operation (at the lower speed limit) before the other, thus reducing the circuit to the equivalent of Figure 9. Along with this greater flexibility, there is the further advantage that more even or sustained drive is obtained by having a current pulse every half wave instead of alternate half waves. In this modified form, the source of alternating current SC supplies power to a main transformer 190. There is a tap 192 at the mid-point of the secondary of transformer 190 which is directly supplied from SC, and the opposed lead 193 extends from SC to points 194 and 195 in switch 150.

The mid-point of the secondary of transformer 190 is negative to lead 197 during one half wave of the A.C. cycle but negative to lead 198 during the other half wave of the A.C. cycle. Accordingly a power tube 157 can be connected from each of leads 197 and 198 across to the mid-point, and when the one power tube is supplying current, the other is not. This provides the desired full wave rectification. The same control knob 185 controls both variable resistances 178. In this way the control knob 185 determines the point in each half wave of the A.C. cycle at which the corresponding grid 175 becomes positive with reference to the cathode of the respective power tube 157. Thus at the will of the operator, current is supplied from 197 and 198 in alternation through the corresponding power tubes 157 and bimetal switch 171 to circuit 159, and by turning the knob 185 in one direction or the other the speed of motor 129 can be increased or decreased, since both resistances 178 are on the shaft 236 of control means 185.

At low speed the knob 185 acts also to control the opening and closing of pressure plates 22 and 23. As seen in Figs. 4 and 12 pressure plate 22 is carried in offset relation by a carrier or slide 200 carrying a roller 202. The vertical framework 203 of slide 200 grips the pressure plate by means of fingers 204. Beneath the slide 200 is a slide 206 carrying a roller 208. Fingers 209 on the vertical framework 210 of carrier 206 grip the pressure plate 23. A wedge 212 mounted on a carriage 214 co-operates with rollers 202 and 208 to move the carriers 200 and 206 and bring the pressure plates 22 and 23 closer together or separate them. The slides 200 and 206 are in guides 216 and are lightly biased toward closed position by leaf spring 219 secured midway by a screw 220 to an upstanding post 221 on slide 206. The free ends of leaf spring 219 bear against a pair of pins 223 on slide 200. Therefore, as carriage 214 moves parallel to the direction of travel of film strip 12, the pressure plates 22 and 23 are opened or closed depending on the direction in which carriage 214 moves. Stops 215 are provided on carrier 200 and stops 218 are provided on carrier 206 so that a minimum space is provided for film strap 12. Stops 218 engage the ends of the guides 216, while stops 215 engage adjustable abutments 222 whereby the minimum space between the pressure plates may be adjusted. Accordingly there is no binding on the film strip as the same is moved through the film gate for scanning. Should a splice or other oversize portion reach the film gate, the pressure plates readily open due to their oppositely tapered edges to pass the oversize portion. The pressure of leaf spring 219 is light enough to permit this.

Referring to Fig. 12 it will be noted that carriage 214 carrying wedge 212 has a rib which projects downwardly through a slot 225 in the elevator frame 114. Rollers 227 mounted on a U-shaped member 228 are secured to this rib so as to engage the lower side of the frame 114 and guide the travel of the carriage 214. Such travel is controlled electrically from the same manual control means 185 which controls the phase shift with relation to power tube (or tubes) 157 and accordingly controls the current supply for low speed drive of motor 129.

A solenoid 230 (see Figs. 9, 10 and 3) has a connecting link 231 to the portion of carriage 214 which projects below slot 225. A spring 233 tends to draw the carriage 214 to the right (in Fig. 3) and solenoid 230, when actuated, draws the carriage 214 and with it wedge 212 to the left, separating the pressure plates 22 and 23.

Figure 9:
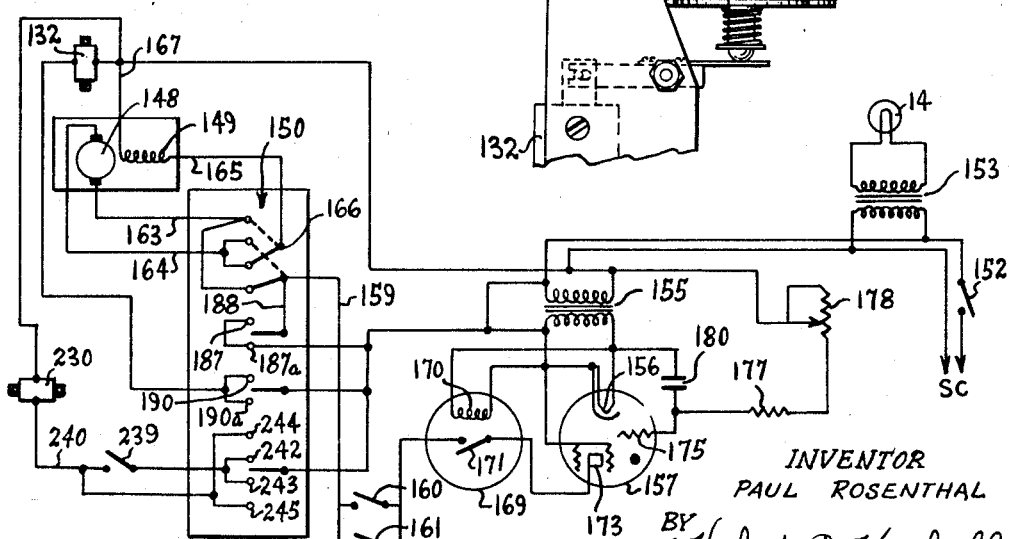
Fig. 9 is a wiring diagram of the current supply to an electric motor which is controlled by common control means with the separation of the pressure plates in the film gate, such common control acting on the motor through a thermionic tube.

The control means 185 (see Fig. 11) have an annular cam member 234, whose orientation about the shaft 236 of knob 185 may be adjusted through set screw 237. A deflected portion 238 of cam 234 acts to depress a plunger 239 to make and break an electrical circuit at 235 through lead 240 to actuate solenoid 230. By adjustment of cam member 234 about the shaft of control means 185, the solenoid can be made to pull the carriage 214 and separate the pressure plates 22 and 23 at just the point in the slow speed range of the film winding mechanism that the operator desires. If the operator can read or decipher material as it passes, up to a certain speed, but is not reading at higher speeds, the member 234 is set to depress plunger 239 just above the specified speed as controlled by control means 185. Referring to Figures 9 and 10, it will be seen that switch 150 has four contacts 242, 243, 244 and 245 corresponding to the two low speed and the two high speed positions of the switch. Assuming low speed drive in one of the two directions, the solenoid 230 is not actuated unless the control means 185 is turned to a high enough speed to bring deflected portion 238 into contact with plunger 239. At such time the circuit is completed from SC through the solenoid 230, lead 240, the microswitch 235 and contact 242 or 243 back to SC. When, however, the switch 150 is turned to either high speed position, the circuit is completed through contact 244 or 245 without regard to the open or closed position of switch 235.

The mechanism described is particularly advantageous in a projection device for magnifying strip film. In order to decipher what is projected, the film winding mechanism should have a slow yet a steady drive which will permit movement of the film for scanning. During scanning the positioning of the film in accurate position by the opposed pressure plates 22 and 23 leads to accurate focus on the screen 20. Yet a release of the pressure plates is automatically effected if the speed of the film winding mechanism is raised above a given point. This is accomplished by the common control of the speed of drive of the film winding mechanism and of the release of the pressure plates. This has been ingeniously worked out for a preferred form of low speed drive of the motor under the control of a thermionic tube.

It is believed that a clear understanding of the invention will be had from the foregoing description. It should be noted, however, that while details of a specific five position switch have been described by way of example, and a specific form of annular contact actuated by the common control means has been illustrated, equivalent devices may be substituted therefor within the scope of my invention as defined in the accompanying claims. In the same way the electrical control of current supply through a thermionic tube to the driving motor has been described in detail in one illustrative form, and it is to be understood that my invention is not limited to such details except as required by the accompanying claims.

I claim:

1. In a microfilm projector having a film gate with opposed pressure plates for flattening film in said gate when in closely adjacent relation to each other to improve the projected image formed by the projector, said pressure plates being separable for avoiding scratching of the film during rapid travel of the film through the gate, and an optical projection system cooperating with said film gate for forming a clear image of the portion of film in said film gate when flattened by said pressure plates, the combination of the film winding means actuated by a reversible electric motor for moving film through said film gate, an electrically actuated device for separating said pressure plates, alternative circuits for selectively supplying alternating current or rectified current to said motor to drive said motor at high or low speed respectively, and an electrical system including a five-pole switch for predetermining the direction and speed of said motor and for the separation of said pressure plates, said electrical system also including a rheostat having a manually operable control for increasing or decreasing the current supply in the circut for low speed operation of said motor in either direction, said manually operable control including a cam having an adjustable connection therewith for actuating a second switch for controlling the supply of current to said pressure plate separating device, whereby adjustment of said adjustable connection between said manually operable control and said cam determines the relative point at which the pressure plates are separated for rapid travel of the film through said gate in either direction.

2. The combination as claimed in claim 1 in which said pressure plates are spring biased toward closed position.

References Cited in the file of this patent

UNITED STATES PATENTS

| | | |
|---|---|---|
| 2,167,530 | Schneider | July 25, 1929 |
| 2,352,077 | Clough | June 20, 1944 |
| 2,404,189 | Place | July 16, 1946 |
| 2,407,009 | Halbrook | Sept. 3, 1946 |
| 2,450,484 | Palmer et al. | Oct. 5, 1948 |
| 2,473,736 | Stern | June 21, 1949 |
| 2,610,540 | Beitz | Sept. 16, 1952 |
| 2,692,529 | Halahan | Oct. 26, 1954 |

OTHER REFERENCES

"Modern Physics," by Jauncey, 1932, Van Nostrand and Company, New York.